July 21, 1925.  1,546,404
J. REECE
POWER TRANSMISSION
Filed Nov. 3, 1923  4 Sheets-Sheet 3

John Reece
Inventor.
by Rogers, Kennedy & Campbell,
Attys.

July 21, 1925.
J. REECE
POWER TRANSMISSION
Filed Nov. 3, 1923
1,546,404
4 Sheets-Sheet 4
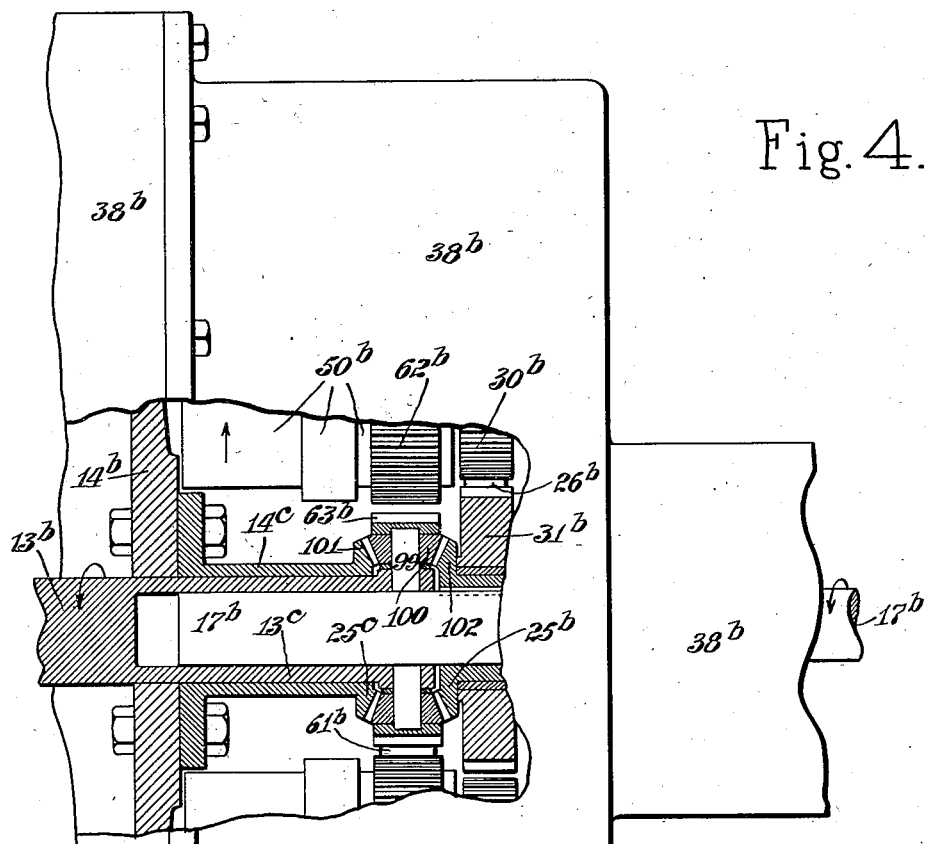
Fig. 4.
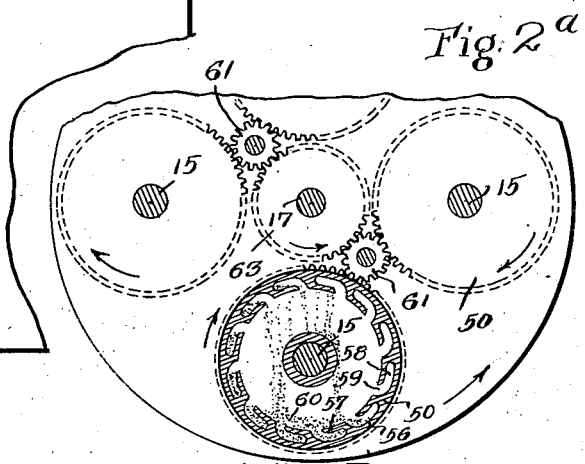
Fig. 2ª
John Reece
Inventor.
by Rogers, Kennedy & Campbell,
Attys.

Patented July 21, 1925.

1,546,404

UNITED STATES PATENT OFFICE.

JOHN REECE, OF BOSTON, MASSACHUSETTS, ASSIGNOR TO REECE TRANSMISSION COMPANY, OF BOSTON, MASSACHUSETTS, A CORPORATION OF MAINE.

POWER TRANSMISSION.

Application filed November 3, 1923. Serial No. 672,508.

*To all whom it may concern:*

Be it known that I, JOHN REECE, a citizen of the United States, residing at Boston, in the county of Suffolk and State of Massachusetts, have invented certain new and useful Improvements in Power Transmissions, of which the following is a specification, reference being had therein to the accompanying drawing.

This invention relates to power transmission and involves a novel method and apparatus adapted to use in various situations and for various purposes where varying speeds of transmission are required, for example, as a part of the power transmission apparatus of motor vehicles.

The general object is to provide improved power transmission for motor vehicles or other machines, and more particularly to afford a mechanism in which the speed ratio and torque are self adjusting to the road conditions or resistance. In the case of a motor vehicle the regulation of the ratio between the engine shaft and the driven parts may be said to be semi-automatic between the maximum and minimum ratios; by which I mean that when the mechanism has been set for either forward or reverse drive the speed will be regulated without any action by the operator other than more or less opening of the throttle of the engine; also, with a set position of the throttle the action of speed ratio adjustment to meet all driving requirements is wholly automatic, and such that when the load or resistance opposed by the driven shaft increases so as to require greater torque than the engine can transmit with the existing speed ratio, a readjustment of action takes place so that the driven speed becomes relatively reduced, and the torque thereby raised to whatever is necessary to maintain the driven parts in rotation. In the case of a vehicle passing from level ground to uphill the transmitting action automatically changes to give the required torque for the additional work, the driven speed becoming correspondingly reduced, thus eliminating the many objections to the prevailing speed change mechanisms.

Further objects are to afford a mechanism in which, when running at full speed, that is at unit ratio, there will take place no internal motion or substantial action of the parts of the mechanism; also to give quietness and smoothness of action; and to minimize transmission of vibrations from the engine to the driven parts. Also it is an object to afford a simple and effective means of reversing the drive. Among other objects and advantages are the ability to bring the vehicle to a stop on an uphill grade without the use of a brake; the ability to lock the car against drive in either direction, for example, when performing test operations of the mechanism in the garage; and the ability to allow the vehicle to move downhill backwardly by merely slowing the engine to a point where sufficient torque is not being maintained to hold the car on the hill. Other objects and advantages of the invention will be made clear in the hereinafter following description of one form or embodiment thereof, or will be obvious to those skilled in the art.

To the attainment of the objects and advantages mentioned, the present invention consists in the novel variable speed transmission apparatus and method, and the novel features of combination, arrangement, mechanism and detail herein described or claimed.

Preliminarily it may be stated that the present invention involves, in combination with the driving member or engine shaft and the driven member or shaft, the novel connections or mechanism characterizing the invention, comprising a movable mass or masses acted upon by the centrifugal force produced by the rotation, and utilizing the centrifugal force in the process of transmitting the energy at varying ratios and torques. In a general way such a plan has been tried by the use of a planetating weight which, as it is drawn toward the axis of the system, against centrifugal force, operates to resist planetation, and so transmit energy to the driven parts, until, passing its extreme position, it is thrown outwardly, tending to cancel its previous action, this plan involving alternation of action, and necessitating a pawl and ratchet or equivalent device to insure one-way advance of the driven parts, and rendering desirable an equalizing reservoir or spring so that the successive impulses may be transmitted steadily to the driven parts. The present invention dispenses with this alternation of action, and with the pawl and ratchet and transmitting spring incurred thereby. This invention utilizes a free or loose mass which is arranged or associated with the driving member so as to be carried around and subjected to centrifugal force by reason of the driving member's rotation, together with means controlled or actuated by reason of the speed difference between the driving and driven members for forcing the mass inward or against its centrifugal force. Broadly, any means may be employed whereby the mass (or a stream or succession of masses) may be compelled to move inwardly against centrifugal force, so long as it is caused by the speed difference as stated; for example, in the case of a flowing mass a suitable forcing or pumping means would serve the purpose. In the preferred embodiment is shown, however, a movable carrier engaging and actuating the mass. In a specific aspect the present invention may be described as having a carrier in the form of a planetating wheel actuated by the relative rotation of the driving and driven shafts, or by reason of their difference in speeds, so as to cause a stream or succession of weights or masses to be forced inwardly against the centrifugal pressure, thereby giving a steady and continuous driving thrust upon the driven shaft; the effect of centrifugal force on such masses, after reaching their inward extreme position, being eliminated from action upon the driven shaft, for example, by their discharge from the main or transmitting carrier or wheel, preferably followed by their reception upon a secondary or return carrier, on which the weights travel outwardly, the pressure of centrifugal force thereon effecting a restoration of energy to the driving parts, and the identical masses preferably thereafter being again fed or delivered to the main carrier, so as to constitute a circuit and maintain continuously the described transmitting and energy conserving operations. The broad principles involved can be embodied in an infinite number of forms, and can be stated more broadly than in the aspect just set forth; and it will therefore be understood that the hereinafter following description and the accompanying drawings are merely for the purpose of illustration, without intention of restricting the invention beyond the basic principles involved.

In the accompanying drawings Fig. 1 is substantially a central longitudinal vertical section view of one form or embodiment of a transmission apparatus illustrating the principles of the present invention, shown adjusted by the control handle to prevent either forward or reverse drive of the driven shaft, and therefore holding it locked.

Fig. 2 is a transverse section taken on the broken line 2—2 of Fig. 1, with the reversing parts omitted, and this figure may be considered as representing either the condition of Fig. 1, or the condition of the parts when the driven shaft is being driven at reduced (not at unity) ratio.

Fig. 2ᵃ is a section similar to Fig. 2 but showing a simplified embodiment in which the second or return carrier is omitted.

Fig. 4 is a view corresponding to Fig. 1, but showing a modified embodiment.

Figure 1:
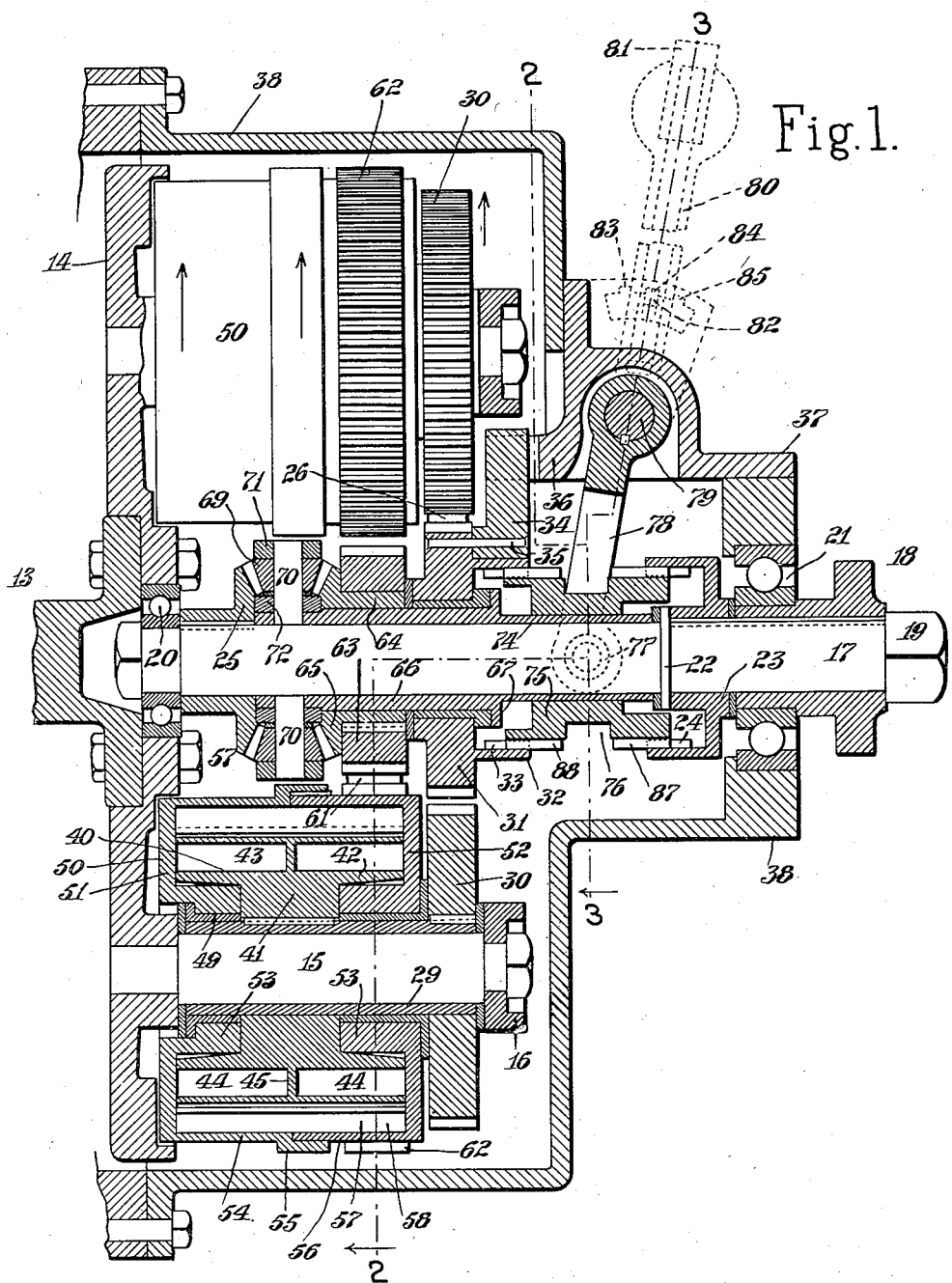

The driving member 13 may be the crank shaft of an internal combustion engine, such as is chiefly used on motor vehicles; and attached to the shaft is shown a wheel, disk or support 14 which, with the mechanism that rotates with it, may be considered as the fly wheel, and gives the steadying effect of the fly wheel, customarily used with such engines. Projecting toward the right from the fly wheel disk 14 are a series of studs 15, the other ends of which are interconnected and stiffened by a supporting ring 16, said studs serving to support certain of the mechanisms to be hereinafter described. The elements 13 to 16 are rigidly connected and may be considered as the driving member of the combination.

The driven parts comprise the member or shaft 17, which it is desired to operate at varying speed ratios relative to the driving member. The right end of the shaft 17 is shown provided with a member 18, which may be part of the usual universal connection to a further transmitting shaft, and is confined by a nut 19. A ball bearing 20 may be provided at the left end of the driven shaft and a similar bearing 21 near the right end. The shaft is shown formed with an integral flange 22 for the purpose of securing certain parts against endwise play. Confined between the flange 22 and the member 18 is a tooth member 23, this and the member 18 being both keyed to the shaft so as substantially to constitute rigid portions of the driven member. The purpose of the teeth 24 on the member 23 will subsequently appear. Keyed upon the left end of the driven shaft is a bevel gear 25. The described elements 17 to 25 are rigidly interconnected, and taken together may be considered as the driven member of the combination.

The general nature or principles of the mechanism intermediate the driving and driven members has been indicated. It may take different forms, that which is shown sufficiently illustrating the principles. It has been stated that the succession or stream of masses which give the vital action to the present mechanism is moved toward or from the axis of the system on a carrier or carriers, and while these carriers might take various forms, in fact any form that will serve to compel the successive masses to travel inward against centrifugal force, such as an endless belt with pockets or holders, I believe the simplest form of carrier to be, and have shown it as, a planetating wheel, disk or similar rotary carrier. It will be understood that each of these rotary, planetating carriers is preferably a balanced member, therefore free from centrifugal force, but owing to its reception of the succession or stream of masses, by means of containers, pockets or other receptacles, it is enabled to take part in the action whereby centrifugal force is utilized in the transmission of the rotary energy to the driven parts, the carrier discharging the successive weights near their extreme inward position, so that the centrifugal pressure will always be unbalanced, at one side only of the carrier. The discharged weights are preferably received by a second, concentric carrier which conveys them smoothly, without heat or injury, to an outward point, where they are redelivered to the first mentioned carrier, the weights thus passing through a continuous path and cycle, acting on the main carrier in one phase, opposed by centrifugal force, and acting on the other carrier in the second phase, assisted by centrifugal force; this circulation of the masses however ceasing whenever there occurs a correspondence in the speeds of the driving and driven members, which condition causes cessation of planetating motion of the main or transmitting carrier.

While the main carrier is interposed between the driving and driven members, and rotates by reason of their difference of speed, and thereby ceases rotation when the speed ratio is unity, the second or return carrier is preferably interposed between the driving member and a stationary element, so that it is in constant rotation, at a suitable speed, as long as the engine and fly wheel are in motion. Reacting against the stationary element the return carrier, urged by centrifugal force, whenever it is engaged by centrifugal masses, operates to throw the energy thereof into the fly wheel, thus conserving the energy, which necessarily is eventually delivered to the driven shaft, constituting a factor in securing increase of driving torque, accompanied by reduction of speed ratio. In some cases the return carrier could be dispensed with, allowing the centrifugal masses to find their way from discharge to feed position in the main carrier, or otherwise providing for their feed, but only at a loss of power, accompanied by other disadvantages, and I therefore prefer the combination of the two carriers, and will continue the description of the present invention upon that basis.

The two rotary, planetating carriers, transmitting and return, are preferably arranged in close association with each other, in fact one concentrically within the other, the transmitting carrier being naturally the outer one and the return or secondary carrier the inner one. Instead of a single group of such transmitting and return carriers I prefer to employ a number of such groups and have shown four of them, mounted respectively on the four studs 15 provided at the interior side of the fly wheel or driving member 14. The construction and arrangement of the inner and outer carriers on each of the studs and their mode of connection respectively to the stationary and to the driven parts of the machine will now be described, beginning with the inner or return carrier.

Each planet stud 15 is shown surrounded by a rotating sleeve 29. This is to support and drive the return carrier, and for this purpose the following connections to stationary elements of the apparatus may be used, so arranged that the rotation of the driving member or fly wheel causes a continuous planetating rotation of the sleeve and carrier. A gear 30 is keyed to the loose sleeve 29. This planetating gear 30 is engaged with a non-rotating gear 31 concentric with the main axis of the apparatus and in fact loose upon the driven shaft or rather loose upon a sleeve which surrounds the shaft. The planet gear 30 might directly engage the central gear 31, which would result in a planetating rotation in the same direction as that of the fly wheel, namely, counterclockwise, but I prefer to turn the planetating parts in the reverse direction for reasons later described. Therefore the gear 30 is shown connected, not directly with the central gear 31, but through an idler pinion 26; there being two of these idler pinions, turning on studs 27 fixed in elongated bosses 28 formed on the fly wheel disk 14, each pinion engaging the central gear and two of the four planetating gears. In order to enable the central gear 31 to take part in the reverse drive it is shown as having a cylindrical extension 32 toward the right with teeth 33 formed at the interior of this extension, cooperating in a manner as will be described. For anchoring the stationary gear 31 its extension 32 has an outwardly extending arm 34, secured to it by rivets 35, which arm is anchored or held against rotation by engagement between the two sides of a fork 36 formed on the stationary frame casing 37, which in turn is secured in fixed relation to the outer frame casing 38 which is shown as enclosing substantially all the mechanism involved in the described embodiment of my invention.

The inner or return weight carrier 40 is keyed, through its hub 41, to the planetating sleeve 29. The carrier is preferably formed with a series of weight holders, for example, in the following manner. From the cylindrical inner wall 42 extend a series of walls or partitions 43 of the shape shown or other suitable shape, arranged to form a series of holders in the form of chambers or pockets 44, which may be closed at their ends by the elements 51, 52, later described. Each pocket 44 may be separated into two parts by a wall 45, for the purpose of strengthening the construction. The rotation of the carrier being clockwise in Fig. 2 each pocket or chamber 44 preferably has its opening 46, for entrance and discharge of the series of centrifugal weights or masses, at the rear portion of the chamber, as shown.

Figure 2:
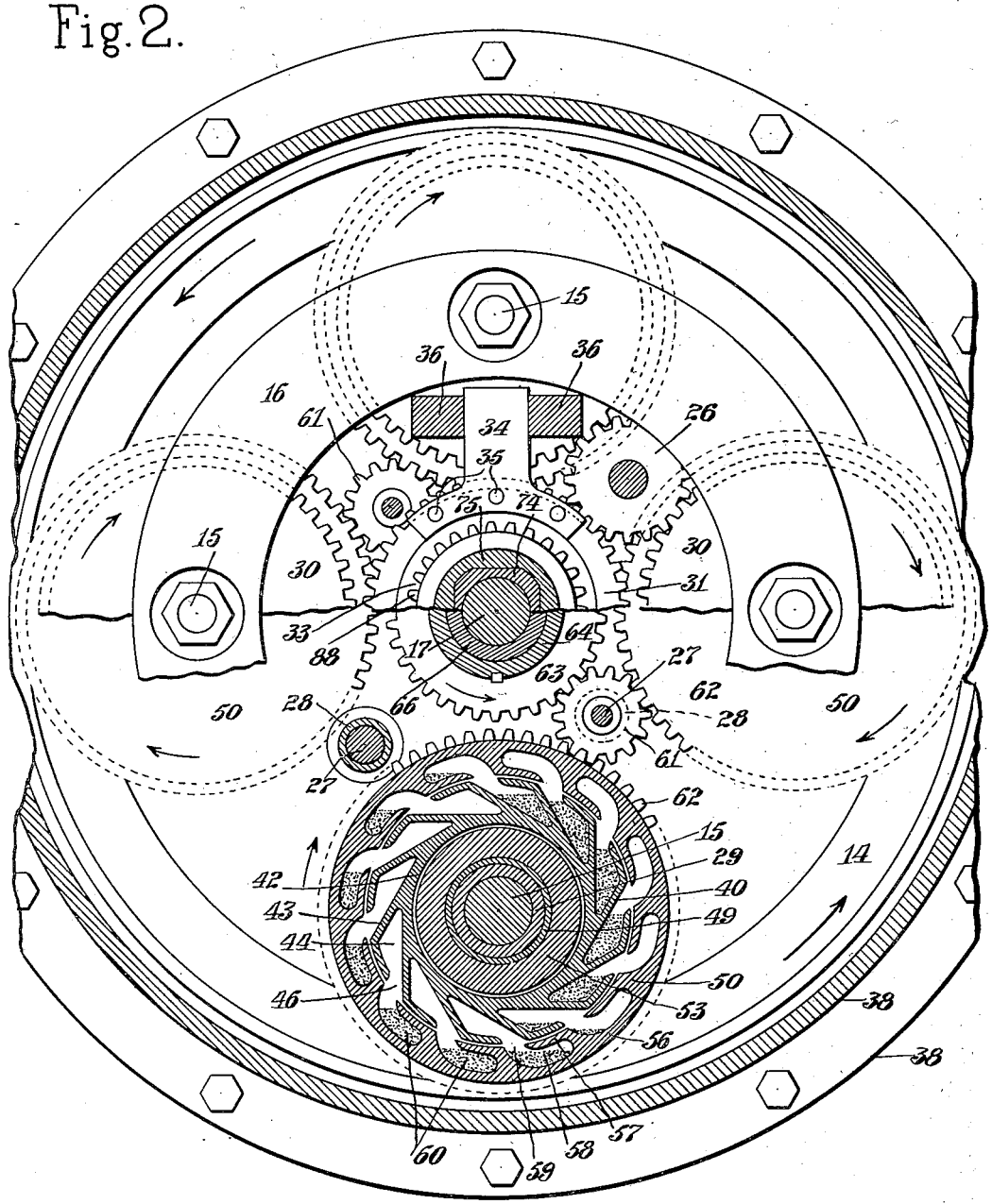

The main or outer carrier or planetating wheel 50, loosely surrounding the planet sleeve 29, with a bushing 49 between to afford a suitable bearing surface, also rotates clockwise in Fig. 2, but unlike the interior carrier, the speed of the main carrier changes with the speed ratio, its planetating speed being zero when the ratio is unity and increasing to its maximum as the driven speed approaches zero.

The main carrier 50 has an annular left side wall 51, a similar right side wall 52, and a hub 53 for each of these walls, each hub with its wall being separate from the other for purposes of assemblage. Integral with the wall 51 is a cylindrical outer wall 54, having a slightly offset extension 55, giving a snug engagement with the corresponding cylindrical exterior wall 56, integral with the end wall 52, the two exterior walls being preferably keyed as indicated in Fig. 1 so as to constitute of the carrier 50 a substantially rigid unitary structure. The main carrier thus encloses the return carrier 40 both endwise and circumferentially. The weight holders or pockets 44 of the inner carrier face outwardly and are thus enabled to be arranged closely adjacent to similar holders or pockets of the outer carrier, facing inwardly, so that the weights discharged by the main carrier may readily be received in the pockets of the other, carried outwardly, and redelivered to the pockets of the former.

The means on the main carrier 50, for receiving and holding the series of weights or masses is shown as composed of inwardly extending walls or partitions 57 producing a series of chambers or pockets 58, the openings 59 of which, for entrance and exit of masses, being at the forward inner portions of the pockets.

It will be understood that in describing the respective carriers as having weight holders or mass receptacles it is not intended to limit these to pockets, as shown, since obviously any means of engaging the successive centrifugal masses or portions of weight, and forcing or compelling them to move inwardly against centrifugal force, will serve the purposes of the present invention. Physically the weight holders in the present embodiment are shown as taking the form of vanes or buckets because in the present embodiment I have adopted what may be termed flowing weights for the centrifugal masses and the described construction affords suitable retainers or containers adapted to receive the successive weights, carry and force them as described, and discharge them. As flowing weights I might employ spheres, for example, a multiplicity of small, highly polished, steel balls, or on the other hand a liquid, preferably mercury on account of its advantageous density, and the reference 60 applied to the centrifugal weights herein may be considered as referring to portions of mercury, as illustrative of the principles involved. A combination of solid parties with a liquid vehicle might be employed. A suitable quantity, a number of pounds, of mercury will simply be placed within the spaces between the two carriers, and it serves the purposes of the present invention, readily dividing itself into a series of weights, imposing centrifugal force as desired, passing inwardly in the weight holders or pockets of the main carrier wheel 50, discharging from such pockets to the pockets of the return wheel 40, imposing centrifugal force on the last mentioned wheel, and being delivered therefrom to the main carrier wheel, for recirculation through the described two phases of centrifugal mass action. The surfaces with which the mercury come in contact should be constructed of material proof against injury by contact with the mercury.

I will next describe the preferred mode in which the main carrier 50 is compelled to rotate clockwise in Fig. 2, at a speed dependent on the existing speed ratio, or proportional to the difference in speed of the driving and driven shafts, so as to force the mass train inwardly against centrifugal force. The planetating carrier being mounted on the driving member, the simplest mode of actuation is to gear it to the driven shaft, and for this purpose the carrier 50 is provided with a planetating gear 62 being shown surrounding the carrier, engaging with a central gear 63 keyed to a hub 64, which, during forward drive, or when the driven shaft is locked as in the adjustment shown in Fig. 1, is substantially rigid or fixed with the driven shaft, so that the central gear may be considered as keyed directly to the driven shaft. This assumption is not true when reverse drive is in effect, as will later be described. Instead of meshing the planet gear 62 directly with the driven shaft central gear 63, which would give counter-clockwise planetation, it is preferred to introduce between them idler pinions 61, analogous to the idler pinions 26, and mounted on similar studs 27, each pinion engaging the central gear and two of the planetating gears.

The two carriers have been stated as preferably planetating in a direction the reverse of the fly-wheel rotation. This is advantageous because if the planetation is in the same direction as the fly wheel rotation, the opposing actions may be such as to impair the mass transfer or compel disadvantageous proportioning of the central and planetating gears, whereas with the illustrated construction the centrifugal forces about the main and planetating axes do not conflict in the discharge of the masses from the main carrier, and effective transfer to the return carrier results.

The forward driving action can now be explained. It is presupposed that the clutch device is shifted from the Fig. 1 position so that the driven shaft is not locked against rotation but is in rigid connection with the central gear 63. It is clear that if the driven shaft and central gear are held absolutely against rotation, the carrier 50, attached to the planetating gear 62, will merely rotate clockwise about the stud 15 as it is carried bodily around with the driving parts. If the planetating carrier 50 is not engaged by centrifugal weights, or otherwise retarded in its rotation, it will simply freely planetate without effect. If now the rotation of the carrier be retarded, for example, by applying centrifugal force through the masses 60, the tendency is to forwardly drive the driven shaft. The centrifugal force referred to is that due to the resultant path each mass is constrained to follow. This will be very considerable, when the fly wheel is at a high speed of rotation. The centrifugal force, for a given mass, increases as the square of the rotary speed. The driven shaft will be started into rotation by this centrifugal action whenever the latter becomes sufficient to retard the planetating rotation of the carrier. With ordinary loads the present invention is able to bring about unitary speed ratio, namely, when the centrifugal force of the masses in the carrier 50 is sufficient to prevent entirely the planetating motion and so to compel the central gear 63 and driven shaft to turn at engine speed, these several parts all going around with the fly wheel substantially as though locked together, thus giving an exceedingly quiet and effective transmission at unit ratio, free from interior play of the mechanism.

When the driven shaft load is increased to a point too great to be thus driven at engine speed, under any given conditions, the driven speed reduces, and the fly wheel speed becomes temporarily reduced to a point where the centrifugal force of the masses is not sufficiently great to maintain unitary drive, which causes the main carrier 50 to planetate. The weights then are forced inward by the carrier 50, and are discharged into the return carrier 40, thus imposing centrifugal force on that carrier, accelerating its planetating motion, and consequently delivering rotary energy and increasing the speed of rotation of the fly wheel. With this increase of speed the centrifugal force of the masses increases, thus more forcibly retarding the carrier 50, and increasing the torque delivered to the driven shaft, which was the object to be accomplished. In fact the action will adjust itself so as to drive the driven shaft at the greatest speed consistent with the delivery thereto of effective torque. Thus a self maintained balance is brought about, wholly by the action of the device, affording always the necessary torque for any given load conditions and the greatest possible speed available with such torque. All these adjustments take place without the need of human action, the car slowing down to the most advantageous speed, and receiving the necessary torque to overcome the road conditions; although the operator may of course always supplement the readjustment of conditions by means of the throttle, opening it to create increased torque and speed, and vice versa.

The successive centrifugal masses or weight portions moved inwardly by the main carrier, are discharged at or near their most inward point of movement. This could be a free discharge across the interior space, and the mercury maintained in a sort of pool within the outer part of the carrier, as seen in Fig. 2$^a$, or the discharged mercury could be otherwise disposed of, and a supply of mercury suitably delivered to the outward portion of the main carrier. This would incur loss of power, and therefore as stated, I prefer to employ a second carrier, such as the interior pocket wheel 40, into which the main carrier discharges the centrifugal masses, and which carries them around outwardly and redelivers them to the main carrier. Each portion of the centrifugal weight in this way passes through two phases, taking part in the delivery of rotary energy to the driven shaft while being forced inwardly, and delivering energy back into the fly wheel or driving member, while moving outwardly. Fig. 2 indicates how the pockets of the main carrier discharge their masses into the pockets of the return carrier near the inward positions thereof. This discharge will not be uniform nor will one mass be transferred as an entity from an outer to an inner pocket, because the two carriers are always at different speeds, the inner carrier rotating at a steady high speed as long as the fly wheel rotates steadily, and the main carrier rotating at varying speeds from maximum to zero. In any case, no matter at what rate of discharge by the main carrier to the return carrier, the centrifugal masses received by the latter are carried around outwardly, and while so moving are influenced by centrifugal force to urge faster rotation of the return carrier, and therefore of the fly wheel. It will be noticed that the pockets of the two carriers are so designed that the main carrier holds its centrifugal masses until they have moved inwardly to the desired discharge point and then discharges them, while the return carrier pockets securely hold the masses during their return or outward movement and then release or deliver the masses back into the main carrier at or near their most outward point of travel. While the individual masses act as described, each passing through two cycles, the conditions in both carriers are maintained continuously, so that the torque delivery and restoration are continuous actions, as already explained.

I believe this to be the first known mechanism practically capable of producing steady continuous drive of the driven shaft with increased torque, and speed less than the driving shaft, under conditions of varying load, with torque and speed adjusting themselves. In one aspect the substance of the present invention is the movable carrier which is mounted in an eccentric location on the driving member or fly wheel, combined with the succession of circulating masses; the carrier being actuated by connections from the driven member, and therefore varying in speed, running the faster when the driven shaft runs the slower, and arranged so as to cause the succession of masses to circulate in such manner that each mass, while moving inwardly, toward the axis of the system, acts through its centrifugal force to resist or retard the carrier and thereby urge forward the driven member, each mass at the end of this action being displaced or discharged so that its further movement will not counteract and destroy the centrifugal action and results mentioned.

The driving connections of this invention therefore are of a yielding, rather than a positive, character; the utilization of centrifugal force, for driving purposes gives a perfectly resilient connection between the two shafts, which is both effective and free from irregular or jerky action. At low engine speeds the centrifugal force is negligible, and there will be no transmission, thus having the effect of throwing out the usual clutch, and so dispensing with the need of a clutch; but as the speed increases the centrifugal force comes into operative effect, and drive takes place when the transmitted torque exceeds the load on the driven shaft. For similar reasons a vehicle can be allowed to run downhill, forwardly or backwardly, by sufficiently slowing the engine, and without any actual disengagement, resumption of drive being available at any moment by opening up the throttle so as to speed up the engine.

The problems of motor vehicle transmission are largely due to the conditions introduced by the use of the internal combustion or gasolene engine. Such engine constitutes perhaps the most advantageous source of power for motor vehicles. It is also true that in the most usual type of present day motor vehicle the application of this power for driving purposes is accomplished through what is well recognized to be a mechanical makeshift, namely the transmission gears, with a friction clutch between the engine fly wheel and gears. It is necessary to use this makeshift on account of certain peculiarities of the gasolene engine. In the first place the engine must be run at a certain speed, not only to develop power but even to exert effective torque. Therefore it becomes inherent that the engine must be in rotation before it is connected to the machine that it is going to drive. This is the first reason for the friction clutch. In the second place a gasolene engine of reasonable proportions for motor vehicle requirements is not capable in itself of delivering sufficient torque, or in the right way, to meet necessary road or driving conditions. Consequently a gear transmission is employed to give the engine the required mechanical advantage. It is necessary for the operator to shift these gears to change the speed ratio and overcome various driving conditions. In order to shift the gears the engine must first be disconnected from the same, which is the second reason for the friction clutch. It is obvious that if enough gear changes to meet all the various road conditions were supplied the operator would have an extremely inconvenient machine to handle. As a matter of practise with only the customary three speed gear shift, designers endeavor to so construct the machine that gear shifting is eliminated as much as possible. This is a compromise between the necessary resulting evils, and is usually at the cost of engine efficiency. It means a comparatively high speed engine with a large gear reduction at the rear axle. My invention, first of all, elminates all gear shifting, but still embodies the requirement of giving the engine the necessary mechanical advantage. This is accomplished by the fact that, as the weight is drawn from the outside to the inside position against centrifugal force, which force is exerted as torque on the driven shaft, it is endowed with a potential energy due to this change of position. This potential energy is used up as the weight moves from the inside to the outside position, and delivers an assisting torque to the driving parts, using the stationary element or central gear as a fulcrum in exerting this force. This delivery of energy to the driving parts through the stationary element promotes the required mechanical advantage, and the high torque delivered to the driven shaft.

Despite many suggested forms of transmission the prevailing one today is that in which a clutch is disengaged, gears then shifted by control levers to alter the ratio, in a step by step manner, followed by reengagement of the clutch, the engine being throttled during these operations. The described shortcomings of such mechanisms are notorious, and I believe have not been satisfactorily overcome. The present invention is believed to be on wholly novel principles and to secure the several advantages and avoid the drawbacks hereinabove referred to, dispensing with change speed gearing and also with clutches.

In the present invention is involved transmitting mechanism, between the driving and driven members, which depends on centrifugal force for its operation, and of such character that continuous as distinguished from intermittent power transmission occurs, not merely at unit speed ratio, but irrespective of the conditions of load and ratio. In prior mechanisms utilizing centrifugal weights the transmission has been intermittent with reduced speeds, requiring special expedients to steady the motion of the driven shaft, such as pawl-and-ratchet and transmitting spring. With the present invention an increase of load brings about automatically a decrease of relative driven speed, accompanied by an increase in the torque delivered to the driven member, the transmission of torque being maintained continuously. The purpose of the centrifugal weights, or body of mercury, is to afford what may be termed a weight-train or mass-train, which as a whole is carried bodily around by the driving member, and the several portions of which, whether continuous, discontinuous, liquid or solid, are subject to centrifugal force and capable of inward movement against such force. The weight-train is arranged or guided to traverse a given path or circuit, the same being forced inwardly by any suitable connections from the driven member, such as the planetating gear and pocket wheel 50, so that the centrifugal force imposes a resistance, and effects the drive of the driven member in direct opposition to the load or drag thereon. The mechanism is self adjusting, giving increased continuous torque on the driven shaft, accompanied by decrease of speed ratio, when compelled by the increase of load. In a sense the centrifugal device, carried around with the driving member, is arranged, by reason of the described or other connections from the driven member, so that the centrifugal force in the device is continuously opposed to the load on the driven member. As the load slows down the driven member so that the carrier 50 planetates, thereby delivering mercury to the return carrier, and increasing the speed of the fly wheel, the centrifugal force of the mercury is intensified to such a point that the increase in load is overcome and the necessary torque delivered to drive the driven shaft. A continuous centrifugal force is thus created by the parts carried along with the driving member, and this is continuously transmitted as an uninterrupted, although variable, torque to the driven member.

Fig. 4 shows a modification in which the planetating parts are carried around the axis of the system, not upon the engine or driving shaft, but upon a separate rotating part or support turned by the driving shaft. The engine shaft $13^b$ does not have the fly wheel disk $14^b$ mounted directly upon it, but the latter is secured to a sleeve $14^c$ loosely surrounding the engine shaft, which has a hollow rightward extension $13^c$ for this purpose. The mechanism is accommodated within a fixed casing $38^b$ as before. The driven shaft $17^b$ extends partly within the driving shaft as shown. Loosely surrounding the driven shaft is the fixed central gear $31^b$ corresponding to the gear 31 in Fig. 1. This cooperates with gear 30 in actuating the return carrier. The main or exterior carrier $50^b$, and the return carrier, are mounted in planetating position upon the fly wheel disk $14^b$. The main carrier is planetated through its gear $62^b$ corresponding with gear 62 in Fig. 1. This engages indirectly with the central gear $63^b$ through an idler pinion. This is not carried by the driven shaft as before, but is an intermediate gear engaging both the driving and driven shafts. Pins 99 connect the gear $63^b$ with the driving shaft and these pins are engaged by bevel pinions 100. The sleeve $14^c$ has a bevel gear 101 engaging all the pinions 100 and the driven shaft carries a similar bevel gear 102 engaging them. With this arrangement when the driving shaft is turning faster than the driven shaft the fly wheel disk $14^b$ and the planetating parts are carried around at substantial speed, in fact faster than the driving shaft. When at unit ratio the driving, driven and fly wheel parts all turn together, and planetation ceases. For the purposes of description the fly wheel parts, including disk $14^b$ may be considered as a driving member turned by the energy of the engine shaft; and when it is stated that the planetating parts are carried around by the driving parts, in connection with Fig. 1, it is to be understood that broadly they can be carried around by the indirect manner of Fig. 4 or otherwise.

Figure 3:
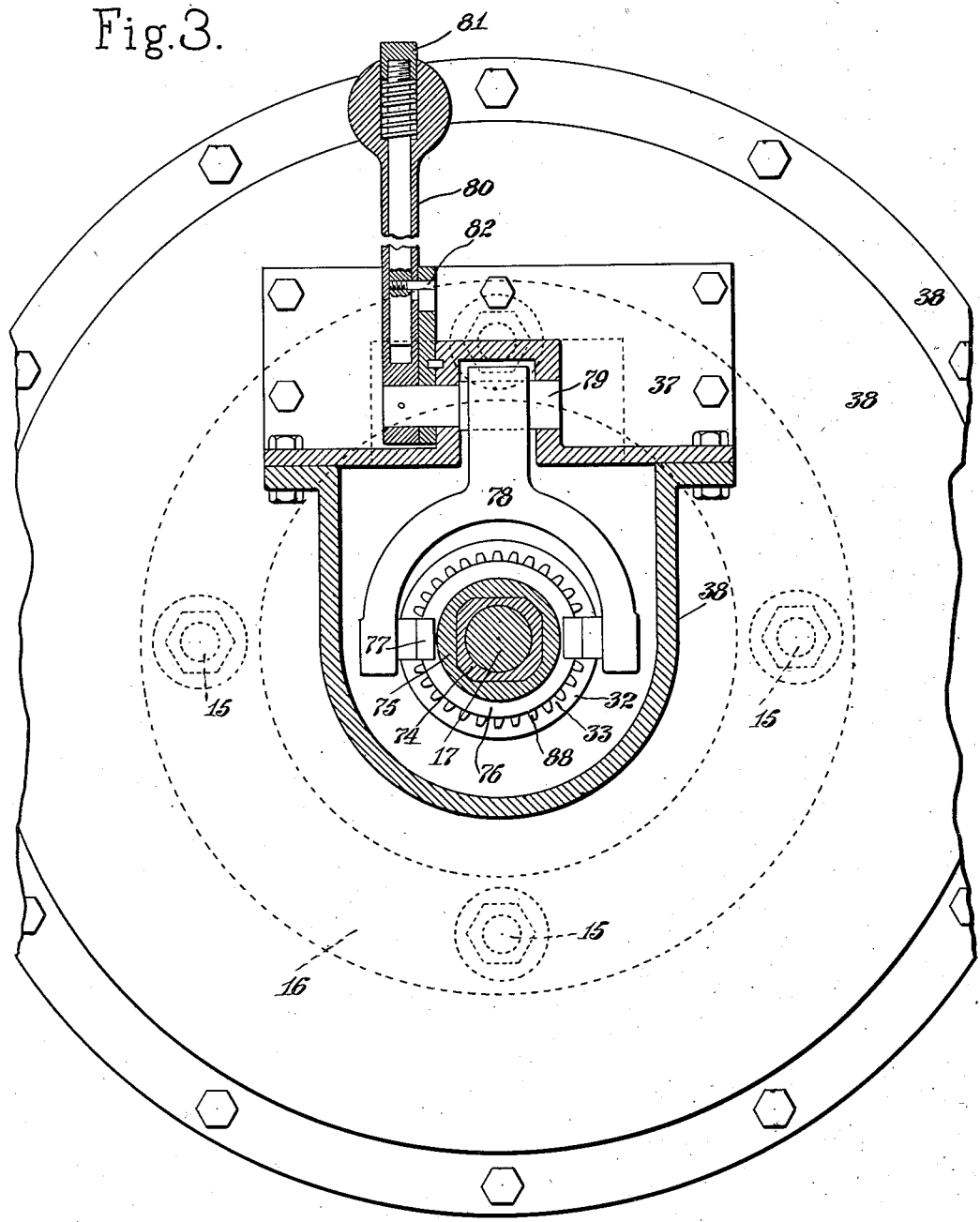
Fig. 3 is a transverse section taken on the broken line 3—3 of Fig. 1.

The above description has reference to the principles of this invention for driving in one direction, or forwardly; and I will now describe a convenient mode of construction whereby the direction of rotation of the driven shaft may be reversed, as is essential with motor vehicles and other machines. This reversing means is herein illustrated on the embodiment of Figs. 1, 2 and 3, but for convenience is omitted from Fig. 4.

The hub 64 to which the central gear 63 is secured has been treated as being rigid with the driven shaft 17, but this is true only during forward drive. The hub carries at its left end a bevel gear 65. The hub and gear surround a sleeve 66 which in turn surrounds the driven shaft. The sleeve extends considerably to the right, for taking part in the reversing of the drive, and at a middle point has a positioning flange or rib 67, between which and the hub 64 is located the stationary central gear 31, already mentioned.

The sleeve 66 surrounding the driven shaft carries near its left end a series of bevel pinions 69, engaging the bevel gear 65 at one side, and at the other side engaging the bevel gear 25, already mentioned, which is keyed to the driven shaft. Four such pinions 69 are shown, turning upon the same number of short stud shafts 70, projecting outwardly from recesses in the sleeve 66. An outer holding ring 71 steadies the extremities of the studs, and the illustrated inner ring 72 may be rigid or integral with the outer ring, so that the system of bevel pinions, always turning with the sleeve 66, is maintained as a rigid system, efficient for transmission between the bevel gears. It will be clear that when the sleeve 66 is rendered rigid with the driven shaft the system of bevel gears and pinions becomes rigid, and the gear 63 becomes a part of this rigid system, for the purposes of the described forward driving action. When the sleeve is free to turn relatively to the driven shaft, rotation between the bevel gears and pinions is possible, and this takes place during reverse drive, as will now be explained.

The right hand extension 74 of the central sleeve 66 is shown flattened or squared in cross section, and it always carries around with it the reversing slide 75, which is capable of being moved right and left in the process of reversing. In order to shift the slide it is shown as formed with a circumferential groove 76 engaged by the two roller studs 77 at the opposite sides of a yoke arm 78 secured upon a shaft 79 mounted in the fixed frame part 37. From another part of the shaft 79 extends a handle 80, serving as the reversing lever of the mechanism. A locking member or button 81 on the handle operates a locking pin 82 which may thus be engaged with one or another of the three notches 83, 84 and 85, the three positions giving adjustments respectively for forward drive, locking against either drive, and reversing drive.

The reversing slide 75 is provided with two sets of clutch teeth 87 and 88 respectively, the former arranged to engage the teeth 24 of the member 23 keyed to the driven shaft, and the latter engaging the teeth 33 provided on the stationary member or gear 31. Fig. 1 shows both sets of teeth engaged and thereby the driven shaft, through the reversing slide, is locked to the stationary parts of the mechanism, and thus incapable of rotation. The reversing handle 80 is in its central position. If it be moved to the left in Fig. 1 so that the pin 82 will engage the notch 83 the reversing slide becomes disengaged from the stationary parts, and remains engaged only with the teeth 24, connected to the driven shaft. By this the central sleeve 66 is locked to the driven shaft and forward drive takes place in the manner explained.

If the reversing handle be thrown to the other extreme the slide 75 is shifted to disengage the teeth 23 and engage only the stationary teeth 33. In other words, by this adjustment the central sleeve 66 is rendered stationary. Therefore, the pressure or tendency which causes rotation of the central gear 63, will no longer tend to directly rotate forwardly the driven shaft, but will afford reverse drive in the following manner. The gear 63 carries the bevel gear 65. The studs 70 carrying the bevel pinions 69, being held stationary with the sleeve 66, the rotation of the bevel gear 65 will operate through the pinions to turn the opposite bevel gear 25, and therefore the driven shaft, in the reverse direction.

The reversal could obviously be effected in various other ways, for example, by a wholly separate reversing device, outside of the present invention, but the described arrangement is compact and efficient, and sufficiently illustrates the purposes to be accomplished and the principles thereof.

This application is a continuation in part of copending prior application Serial No. 531,594 filed January 25, 1922.

It will thus be seen that I have described a power transmission method and apparatus embodying the principles and attaining the objects and advantages of the present invention. Since many matters of construction, arrangement, combination, design and detail may be variously modified without departing from the principles involved, it is not intended to limit the scope of the present invention except in so far as set forth in the appended claims.

What is claimed is:

1. Power transmission apparatus comprising driving and driven members, in combination with a revoluble support turned by the driving member, a centrifugal mass and a cooperating device, arranged eccentrically on said support, and thereby revolved bodily around the axis thereof, said device adapted to be actuated to thrust the mass inwardly, a connection from the driven member to said device for actuating it when the driving and driven members are rotating at different speeds; and means cooperating with the mass moving outwardly to transmit the centrifugal force thereof as forward torque to the driving member.

2. Power transmission apparatus comprising driving and driven members, in combination with a revoluble support turned by the driving member, a centrifugal mass and a cooperating device, arranged eccentrically on said support, and thereby revolved bodily around the axis thereof, said device adapted to be actuated to thrust the mass inwardly, a connection from the driven member to said device for actuating it at a rate corresponding with the existing speed difference of the members, whereby the centrifugal force causes one-direction torque to be transmitted to the driven member, and means cooperating with the mass moving outwardly to transmit the centrifugal force thereof as forward torque to the driving member.

3. Power transmission apparatus as in claim 2 and wherein the means cooperating with the mass moving outwardly comprises a movable device on the revoluble support arranged to receive the mass from the first device at an inward position, conduct it outwardly and redeliver it to the first device, a stationary member, and connections from the stationary member to the second device, whereby the thrust of the centrifugal force of the outwardly moving mass causes forward thrust on the driving member.

4. Power transmission apparatus comprising driving and driven members, in combination with a revoluble support turned by the driving member, a succession of mass portions and a cooperating device, arranged eccentrically on said support, and thereby revolved bodily around the axis thereof, said device adapted to be actuated to thrust the mass portions inwardly in succession, a connection from the driven member to said device for actuating it at a rate corresponding with the existing speed difference of the members whereby continuous one-direction torque is delivered to the driven member; and means cooperating with the mass portions moving outwardly to transmit the centrifugal force thereof as forward torque to the driving member.

5. Power transmission apparatus comprising driving and driven members, in combination with a revoluble support turned by the driving member, a mass train and a cooperating device, arranged eccentrically on said support, and thereby revolved bodily around the axis thereof, said device adapted to be actuated to thrust portions of the mass train inwardly, in procession, in opposition to the centrifugal force thereof, and successively discharge the same, a connection from the driven member to said device for actuating it at a rate corresponding with the speed difference of the members, whereby the centrifugal force is transmitted continuously to the driven member; and means cooperating with the mass portions moving outwardly after discharge from said device to transmit the centrifugal force thereof as continuous forward thrust upon the driving member or support.

6. Power transmission apparatus comprising driving and driven members, in combination with a revoluble support turned by the driving member, a plurality of mass portions and a movable carrier, arranged eccentrically on said support, and thereby revolved bodily around the axis thereof, said carrier adapted to be actuated to thrust the mass portions successively inwardly and release them, a connection from the driven member to said device for actuating it at a rate corresponding with the existing speed difference of the members, whereby the centrifugal force is transmitted as continuous torque to the driven member; and a second movable carrier arranged to receive the masses released by the first carrier and conduct them outwardly for reengagement by the first carrier.

7. Apparatus as in claim 6 and wherein are connections between the second carrier and a stationary member such that the second carrier is actuated by the revolution of the support whereby the centrifugal force of the outwardly returning mass portions imposes a forward thrust upon the driving member.

8. Apparatus as in claim 6 and wherein the described elements are arranged so that the discharge of mass portions from the first to the second carrier is assisted by the centrifugal force therein.

9. Apparatus as in claim 6 and wherein the two carriers are adjacent planetating wheels formed with holders for the masses.

10. Apparatus as in claim 6 and wherein the two carriers are arranged one within the other.

11. Apparatus as in claim 6 and wherein the carriers are planetating wheels, the first arranged concentrically outside the second.

12. Apparatus as in claim 6 and wherein the carriers are planetating wheels, the first geared to a central gear connected to the driven member, and the second geared to a stationary central gear.

13. Apparatus as in claim 6 and wherein the respective carriers consist of pocket wheels, and the masses are flowing weights.

14. Apparatus as in claim 6 and wherein the carriers are actuated in a direction the opposite to the revolution of the support.

15. Power transmission apparatus comprising driving and driven members, a revoluble support turned by the driving members, a train of loose mass portions and a cooperating device mounted on said support, a connection from the driven member to the device causing its actuation when the driven member turned slower than the driving member, whereby to force the successive mass portions inwardly and release them, and means acted upon by the outwardly moving mass portions for transmitting the centrifugal force thereof as torque to the driving member.

16. Power transmission apparatus comprising driving and driven members, in combination with a revoluble support turned by the driving member, a centrifugal mass adapted to pass through inward and outward phases of movement while carried around with said support, means actuated from the driven member for forcing the mass inwardly, whereby forward thrust is imparted to the driven member, and separate means acted upon by the mass returning outwardly to impart forward thrust on one of the members.

17. Apparatus as in claim 16 and wherein the second means comprises a connection between a stationary member and the revoluble support such that the centrifugal pressure of the mass moving outwardly is applied as forward thrust on the support.

18. Apparatus as in claim 16 and wherein a plurality of mass portions are forced successively inwardly on said support by the first means to give continuous transmission to the driven member, and operate successively upon the second means as they move outwardly to transmit continuous thrust upon the driving member or support.

19. Apparatus as in claim 16 and wherein the mass is a flowing mass, and the first means is an endless train of pockets operated to carry mass portions inwardly and discharge them, and the second means is a separate endless train of pockets.

20. Power transmission apparatus comprising driving and driven members, in combination with a revoluble support turned by the power of the driving member, a centrifugal mass and a cooperating device, arranged eccentrically on said support, and thereby revolved bodily around the axis thereof, said device having mass holding means adapted to be actuated to take the mass at an outward position and hold and convey it bodily inwardly substantially through the greater part of the effective inward movement of the mass holding means in resistance to its centrifugal force and release it at an inward position to return outwardly for reengagement and repetition of action, and a connection from the driven member to said device for actuating it at a rate corresponding with the existing speed difference of the members; whereby the centrifugal force in the mass is applied as a thrusting pressure in resistance to the actuation of the device and thereby transmitted as a self-adjusting one-direction torque to the driven member.

21. Power transmission apparatus comprising driving and driven members, in combination with a revoluble support turned by the driving member, a centrifugal mass and a cooperating device, arranged eccentrically on said support, and thereby revolved bodily around the axis thereof, said device having a mass holding receptacle adapted to be removed alternately inwardly and outwardly over a given path when the device is actuated, said receptacle shaped and facing during its inward movement to retain the mass against discharge until the two have traveled together through the major part of the inward movement of the receptacle, whereby the receptacle takes the mass at an outward position and bodily thrusts it inwardly in resistance to its centrifugal force and releases it at an inward position to return outwardly for reengagement and repetition of action, and a connection from the driving member to said device for actuating it at a rate corresponding with the existing speed difference of the members; whereby the centrifugal force in the mass is applied as a thrusting pressure in resistance to the actuation of the device and thereby transmitted as a self-adjusting one-direction torque to the driven member.

22. Power transmission apparatus comprising the driving and driven members, in combination with a revolving support turned at high speed by the driving member, a centrifugal mass and a cooperating device arranged eccentrically on said support and thereby revolved bodily around the axis of the support, said device comprising a mass engaging part movable alternately inwardly and outwardly in a predetermined path when the device is actuated, and forming a receptacle shaped concavely toward its direction of movement, whereby the device can take the mass at an outward position and bodily hold and convey it inwardly in resistance to the centrifugal force of the mass substantially to the end of the effective inward movement of the receptacle and release it, and can maintain the mass at an intermediate balanced position when the device is not being actuated, and a connection between the driven member and said device for actuating the device at a rate corresponding with the existing speed difference of the members; whereby the centrifugal force in the mass is applied as a thrusting pressure in resistance to the actuation of the device and thereby transmitted as a self adjusting one-direction torque to the driven member.

23. Power transmission apparatus comprising rotary driving and driven members, in combination with a revolving support turned at high speed by the power of the driving member, a loose mass and a mass thrusting device, arranged eccentrically on said support, and thereby revolved bodily around the axis thereof, whereby the mass is energized by centrifugal force, and said device having a cupped mass-holding receptacle adapted to retain and bodily convey the mass through the most effective portion of the inward movement of the receptacle whereby the mass is bodily thrust against its centrifugal force, and a connection from the driven member to said device for actuating the latter; whereby the centrifugal force in the mass is transmitted as a thrusting torque to the driven member.

24. Power transmission apparatus comprising the driving and driven members, in combination with a revolving support turned by the driving member, a centrifugal mass and a cooperating device arranged eccentrically on said support and thereby revolved bodily around the axis of the support, said device comprising a mass engaging part movable alternately inwardly and outwardly in a predetermined path when the device is actuated, and forming a mass-holding pocket opening toward its direction of movement, whereby the device can take the mass at an outward position and bodily hold and convey it inwardly in resistance to the centrifugal force of the mass substantially through the effective inward movement of the pocket and then release it, and a connection between the driven member and said device for actuating the device at a rate corresponding with the existing speed difference of the members.

25. Power transmission apparatus comprising rotary driving and driven members, in combination with a revolving support turned at high speed by the power of the driving member, a centrifugal mass and cooperating mass receiving pocket movably arranged on said support, and connections from the driven member to said pocket causing it to move alternately inwardly and outwardly when the driven member is turning slower than the driving member, said pocket being directed during its inward movement substantially in the direction of its movement, whereby it may bodily receive, hold and convey the mass substantially throughout the inward movement of the pocket.

26. Power transmission apparatus comprising the driving and driven members, in combination with a revolving support turned by the driving member, a flowing mass and a cooperating device arranged eccentrically on said support and thereby revolved bodily around the axis of the support, said device comprising a mass engaging part movable alternately inwardly and outwardly around an open circuit when the device is actuated, and forming a receptacle shaped concavely toward its direction of movement, whereby the device can take the mass at an outward position and bodily hold and convey it inwardly in resistance to the centrifugal force of the mass substantially through the effective inward movement of the receptacle and release it to return outwardly in a separate path, free of the device, and a connection between the driven member and said device for actuating the device at a rate corresponding with the existing speed difference of the members.

27. Power transmission apparatus comprising the driving and driven members, in combination with a revolving support turned at high speed by the driving member, a centrifugal mass and a cooperating planetary device arranged eccentrically on said support and thereby revolved orbitally around the axis of the support, said device having a planetary center on the support and a mass thrusting part movable alternately inwardly and outwardly in a planetary path about said center and operating to take the mass at an outward position and to thrust it bodily inwardly and maintain its thrusting engagement therewith to a point substantially inwards of the orbit of the planetary center and then to release the mass to return outwardly in a path removed from its inward path, and a connection between the driven member and said device for actuating the device at a rate corresponding with the existing speed difference of the members; whereby the centrifugal force in the mass is applied during its inward movement as a thrusting pressure in resistance to the actuation of the device and thereby transmitted as a self adjusting one-direction torque to the driven member.

28. Power transmission apparatus comprising the driving and driven members, in combination with a revolving support turned at high speed by the driving member, a centrifugal mass and a cooperating planetary device arranged eccentrically on said support and thereby revolved bodily around the axis of the support, said device having a mass receiving pocket movable alternately inwardly and outwardly in a planetary path when the device is actuated, said pocket shaped and arranged to receive the mass at an outward position and to convey it bodily inwardly without discharge to a substantial distance beyond the mid-point of the inward movement of the pocket and then to completely discharge the mass to return outwardly in a path removed from its inward path, and a connection between the driven member and said device for actuating the device at a rate corresponding with the existing speed difference of the members.

29. Power transmission apparatus comprising the driving and driven members, in combination with a revolving support turned at high speed by the driving member, a centrifugal mass and a cooperating planetary device arranged eccentrically on said support and thereby revolved bodily around the axis of the support, said device having a mass receptacle movable alternately inwardly and outwardly around a planetary path, and said receptacle shaped concavely in its direction of travel whereby it receives the mass at an outward position and conveys it bodily inwardly without discharge through the major part of the inward movement of the receptacle and then completely discharges the mass to return outwardly, and a connection between the driven member and said device for actuating the device at a rate corresponding with the existing speed difference of the members.

30. Power transmission apparatus comprising the driving and driven members, in combination with a revolving support turned at high speed by the driving member, a centrifugal mass and a cooperating planetary carrier arranged eccentrically on said support, said carrier having a mass holding receptacle movable inwardly and outwardly in a planetary path and shaped concavely in its direction of travel, whereby it is adapted to take the mass at an outward position and convey it bodily inwardly and release it at an inward position, and a connection between the driven member and said carrier for planetating the carrier.

31. Power transmission apparatus comprising the driving and driven members, in combination with a revolving support turned at high speed by the driving member, a heavy flowing mass and an enclosing planetary device mounted on said support to travel orbitally, said device having a scoop-like receptacle facing forwardly to the direction of planetation and operating to receive a portion of the mass at an outward position, carry it bodily inwardly as an entity and release it at an inward position, and means connecting the driven member and device such as to planetate the device when the driven member is rotating at less speed than the driving member.

32. Power transmission apparatus as in claim 21 and wherein the said device on the revolving support has a plurality of successively acting mass holding receptacles, and a plurality of mass portions cooperating therewith, whereby overlapping action and continuous transmission is afforded.

33. Power transmission apparatus as is claim 29 and wherein the planetary device is formed with an endless train of the concavely shaped receptacles operating successively on separate mass portions and giving continuous torque delivery.

34. Power transmission apparatus comprising the driving and driven members, in combination with a revolving support turned at high speed by the driving member, a hollow planetary carrier and a flowing mass contained therein, mounted eccentrically on the support, the carrier formed with a series of successive scoop-like receptacles facing in the direction of planetary rotation, adapted to convey successive mass portions inwardly and release them successively, and connections from the driven member to the carrier for causing the planetation of the carrier.

35. Power transmission apparatus as in claim 26 and wherein the connection between the driven member and the device on the revolving support is such as to cause the mass engaging part to move around its circuit in a direction the opposite to the revolution of the support.

36. Power transmission apparatus as in claim 27 and wherein the connection between the driven member and planetary device operates to rotate said device in a direction the opposite to the revolution of the support.

37. Power transmission apparatus as in claim 29 and wherein the connection between the driven member and planetary device operates to rotate said device in a direction the opposite to the revolution of the support.

38. Power transmission apparatus as in claim 31 and wherein the connection between the driven member and planetary device operates to rotate said device in a direction the opposite to the revolution of the support.

39. Power transmission apparatus as in claim 34 and wherein the connection between the driven member and planetary device operates to rotate said device in a direction the opposite to the revolution of the support.

40. Power transmission apparatus comprising driving and driven members, in combination with a revoluble support turned by the driving member, a centrifugal mass and a cooperating planetary device, arranged eccentrically on said support and thereby revolved orbitally around the axis thereof, said device mounted to rotate on a planetary axis parallel to the axis of revolution and having means adapted to take the mass at an outward position and bodily thrust it inwardly in resistance to its centrifugal force and release it at an inward position to return outwardly for reengagement and repetition of action, and a connection from the driven member to said device for rotating it in a direction the opposite of its orbital revolution and at a rate corresponding with the existing speed difference of the members.

41. Power transmission apparatus comprising driving and driven members, in combination with a revoluble support turned at high speed by the driving member, a flowing mass and a cooperating planetary carrier, arranged eccentrically on said support and thereby revolved orbitally around the axis thereof, said carrier mounted to rotate on a planetary axis parallel to the axis of revolution and having means adapted to take the mass at an outward position and bodily carry it inwardly in resistance to its centrifugal force and release it at an inward position, and a connection from the driven member to said carrier for rotating it in a direction the opposite of its orbital revolution, whereby with a uniform speed ratio between the driving and driven members the mass is thrust along its inward path at substantially uniform speed.

42. Power transmission apparatus comprising a driving shaft and a driven shaft, in combination with a revoluble support turned at high speed by the driving shaft, a plurality of planetary devices, arranged in balanced relation eccentrically on said support and mounted to rotate on planetary axes parallel to the axis of orbital revolution, a centrifugal mass cooperating with each planetary device, each of said devices having means adapted to take the mass at an outward position and bodily thrust it inwardly in resistance to its centrifugal force and release it at an inward position, and connections from the driven shaft to said planetary devices for rotating them in a direction the opposite of the orbital revolution, whereby the centrifugal force in the masses is transmitted through the planetary devices and said connections as torque to the driven shaft.

43. Power transmission apparatus as in claim 42 and wherein the connections from the driven shaft to the several planetary devices comprise a central gear on the shaft, planet gears on the devices, and intermediate gears connecting the central gear with the planet gears.

44. Power transmission apparatus as in claim 42 and wherein each planetary device consists of a hollow carrier, and each mass consists of a flowing material, and each carrier contains a series of mass thrusting devices, acting successively, and consisting of pockets shaped concavely in their direction of travel.

In testimony whereof, I have affixed my signature hereto.

JOHN REECE.